(12) United States Patent
Kim et al.

(10) Patent No.: US 9,736,378 B2
(45) Date of Patent: Aug. 15, 2017

(54) CAMERA MODULE

(71) Applicant: LG INNOTEK CO., LTD., Seoul (KR)

(72) Inventors: Nae Seong Kim, Seoul (KR); Hack Ho Kim, Seou (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/293,635

(22) Filed: Oct. 14, 2016

(65) Prior Publication Data

US 2017/0034442 A1    Feb. 2, 2017

Related U.S. Application Data

(63) Continuation of application No. 14/484,902, filed on Sep. 12, 2014, now Pat. No. 9,497,364.

(30) Foreign Application Priority Data

Sep. 13, 2013 (KR) .......... 10-2013-0110441
Sep. 13, 2013 (KR) .......... 10-2013-0110442

(51) Int. Cl.
*H04N 5/232*    (2006.01)
*H04N 5/225*    (2006.01)

(52) U.S. Cl.
CPC ....... *H04N 5/23287* (2013.01); *H04N 5/2253* (2013.01); *H04N 5/2254* (2013.01); *H04N 5/2257* (2013.01); *H04N 5/23258* (2013.01)

(58) Field of Classification Search
CPC .. H04N 5/2253; H04N 5/2254; H04N 5/2257; H04N 5/23258; H04N 5/23287
See application file for complete search history.

(56) References Cited

U.S. PATENT DOCUMENTS

| | | |
|---|---|---|
| 4,045,953 A | 9/1977 | Miyazaki |
| 2007/0103555 A1 | 5/2007 | Eromaki |
| 2011/0102667 A1 | 5/2011 | Chua et al. |
| 2011/0103782 A1* | 5/2011 | Tsuruta ............ G02B 7/022 396/55 |
| 2011/0285890 A1* | 11/2011 | Choi ............ H04N 5/2251 348/308 |
| 2011/0304763 A1 | 12/2011 | Choi et al. |
| 2012/0086784 A1* | 4/2012 | Oh ............ H04N 5/2251 348/47 |
| 2013/0222685 A1 | 8/2013 | Topliss et al. |
| 2015/0145967 A1 | 5/2015 | Oh et al. |

OTHER PUBLICATIONS

U.S. Office Action dated Sep. 24, 2015 issued in co-pending U.S. Appl. No. 14/484,902.
U.S. Final Office Action dated Apr. 21, 2016 issued in co-pending U.S. Appl. No. 14/484,902.
U.S. Notice of Allowance dated Jul. 13, 2016 issued in co-pending U.S. Appl. No. 14/484,902.

* cited by examiner

*Primary Examiner* — Paul Berardesca
(74) *Attorney, Agent, or Firm* — KED & Associates, LLP (57) ABSTRACT

The camera module according to the present disclosure can improve reliability by mounting a posture sensor on a PCB and promoting a bending prevention of the PCB.

14 Claims, 6 Drawing Sheets

CAMERA MODULE

CROSS-REFERENCE TO RELATED APPLICATIONS

This application is a Continuation Application of prior U.S. patent application Ser. No. 14/484,902, filed on Sep. 12, 2014, which claims priority under 35 U.S.C. §119 to Korean Application Nos. 10-2013-0110441 and 10-2013-0110442 both filed on Sep. 13, 2013, whose entire disclosures are hereby incorporated by reference.

BACKGROUND

1. Field

The teachings in accordance with exemplary and non-limiting embodiments of this disclosure generally relate generally to a camera module.

2. Background

Concomitant with generalized distribution of various mobile terminals and commercialization of wireless internet services, demands by consumers related to the mobile terminals are diversified to resultantly allow various types of adapters (additional equipment) to be equipped on the mobile terminals. One of the representative adapters, among others, is a camera module configured to photograph an object in a form of a photograph or a video, to store an image data thereof and to edit and transmit as necessary.

Recently, small-sized camera modules are highly demanded on a variety of multimedia fields, such as tablet computers, camera phones, personal digital assistants (PDAs), smart phones, toys and image input devices, such as monitoring cameras and information terminals of video tape recorders.

The currently commercialized optical image stabilization (OIS) camera module can not only move a lens horizontally along an object moving to X and Y axes, but can also move the lens vertically in order to correct a hand shaking phenomenon. Thus, the OIS camera module is mounted at one side of a PCB (Printed Circuit Board) with a gyro sensor to detect a handshake of the lens.

However, the PCB mounted with the gyro sensor and various elements may generate a bending phenomenon due to weight of the gyro sensor and the like. The lens may generate a lens drift phenomenon caused by erroneous signals and various other problems such as defect images, because the gyro sensor mounted on bent PCB detects an inclination as much as a bent angle.

BRIEF DESCRIPTION OF THE DRAWINGS

The embodiments will be described in detail with reference to the following drawings in which like reference numerals refer to like elements wherein.

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
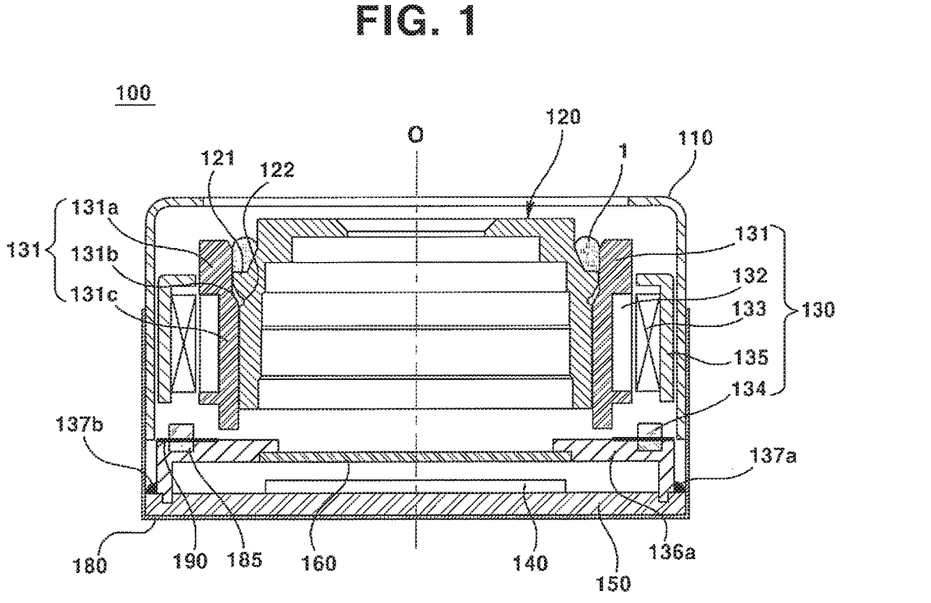
FIG. 1 is a lateral cross-sectional view illustrating a camera module according to an exemplary embodiment of the present disclosure.
Figure 2:
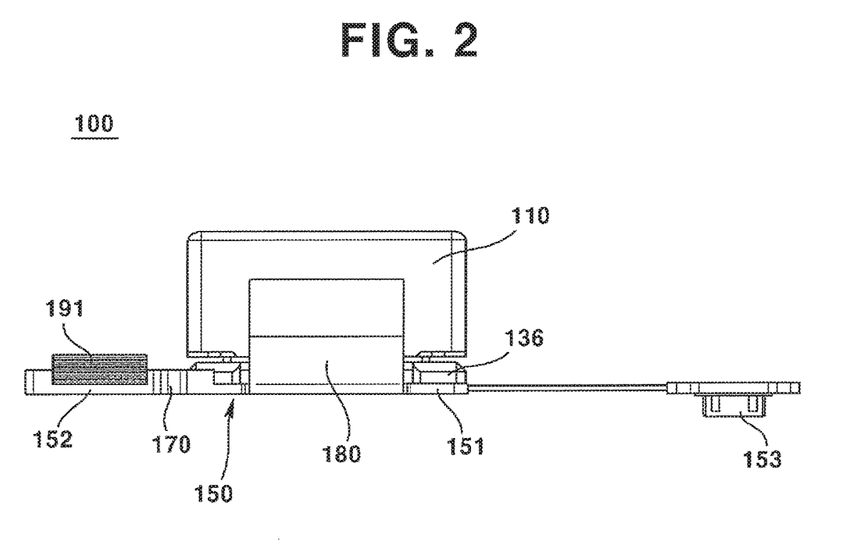
FIG. 2 is a lateral view of FIG. 1.

FIG. 1 is a lateral cross-sectional view illustrating a camera module according to an exemplary embodiment of the present disclosure, and FIG. 2 is a lateral view of FIG. 1. Referring to FIGS. 1 and 2, a camera module (100) according to an exemplary embodiment of the present disclosure may include a shield-can (110), a lens (120), an actuator (130), an image sensor (140) and a printed circuit board (PCB, 150).

The shield-can (110) may accommodate the lens (120) and the actuator (130), and may form an exterior housing of the camera module (100). The shield-can (110) may accommodate the lens (120) and the actuator (130) (described hereinafter) to protect internal elements of the camera module against outside shock, to prevent outside foreign objects from entering the camera module and to protect constituent elements of the camera module (100) against outside electric wave intervention generated by mobile phones. The shield-can (110) may be formed with a metal material. Although the shield-can (110) is described in a cube opened at a bottom, the present disclosure is not limited thereto, and the shield-can may have various shapes at an external look depending on structural changes inside the camera module.

The PCB (150) may include a main area (151) and a sub-area (152) formed at one side of the main area (151). The main area (151) may be mounted with an image sensor (140) and various other elements for driving the camera module (100). The main area (151) may be formed with terminal units (151a, 151b) to be soldered with terminals units (137a, 137b) of the actuator (130, described later), and may be formed with a guide hole (151c) configured to guide the mounting of the shield-can (110) or a base (136, described later), and the shield-can (110) or the base (136, described later) may be formed with a guide lug (not shown) to correspond to the guide hole (151c).

The PCB (150) may include, at the other side thereof, i.e., a side opposite to the sub-area (152), with a connector (153) configured to electrically connect a main board (not shown). Furthermore, the main area (151) and/or the sub-area (152) of the PCB (150) may include a circuit area formed with a semiconductor element such as an image sensor (140) and other circuit patterns, and an open area in which a copper foil layer plated to wrap the circuit area is exposed by photo solder resist.

The image sensor (140) may be arranged at an upper surface of the main area (151) of the PCB (150) to allow being positioned along a lens or more lenses accommodated in the lens (120) and an optical axis (O). The image sensor (140) can convert an optical signal of an object incident through the lens to an electric signal. The lens (120) may be a lens barrel. The present disclosure is not limited thereto and may include any holder structure configured to hold a lens. The present exemplary embodiment exemplifies the lens (120) that is a lens barrel.

The lens (120) may be arranged at an upper surface of the main area (151) of the PCB (150), and arranged at a position corresponding to that of the image sensor (140) and an IR (Infrared) filter (160, described later). The lens (120) may accommodate one or more lenses (not shown).

An IR filter (160) may be interposed between the image sensor (140) and the lens (120), and the IR filter (160) may include an infrared filter. The IR filter (160) may be formed with a film material or a glass material, for example, and may be arranged with a photographing surface protection cover glass or the IR filter may be arranged with an infrared cut-off coated material on a plated optical filter. The IR filter (160) may be mounted at a body (136*a*) of a base (136, described later) to be arranged at a position corresponding to that of the image sensor (140).

A base (136) may be interposed between the actuator (130) and the PCB (150) to protect the image sensor (140) and to position the IR filter (160). The IR filter (160) may be mounted at a hollow part centrally formed at the base (136). The base (136) may be an element forming the actuator (130), integrally formed with the actuator (130), or may be separately formed from the actuator (130).

The actuator (130) may be electrically connected to the main area (151) of the PCB (130) to receive a power for fixing the lens (120) and for adjusting a focus of a video. The actuator (130) may include a bobbin (131) coupled to a circumference of the lens (120) to fix the lens (120), a first coil unit (132) mounted at a circumference of the bobbin (131), a magnet unit (133) mounted at a position corresponding to that of a circumference of the first coil unit (132), a second coil unit (134) mounted at a position corresponding to that of a bottom surface of the magnet unit (133), and a yoke unit (135) configured to fix the magnet unit (133).

The bobbin (131) may be fixed by accommodating the lens (120), and may be positioned at an upper surface of the base (136) distanced at a predetermined height to move in all directions. The first coil unit (132) can horizontally move the lens (120) to a direction of an optical axis (0), and the second coil unit (134) can move the lens (120) to a direction perpendicular or vertical to the optical axis (0). The first and second coil units (132, 134) are provided to supply a power for adjusting an image focus of the lens (120), and the actuator (130) may include terminal units (137*a*, 137*b*) electrically soldered to the terminal units (151*a*, 151*b*, see FIGS. 4 and 5) formed at the main area (151) of the PCB (150).

A current is individually supplied to the first coil unit (132) or to the second coil unit (134) by a driving signal applied to the PCB (150), and the bobbin (131) fixed by the lens (120) can horizontally and vertically move in response to the magnet unit (133) interacting with the first coil unit (132) or the second coil unit (134). The actuator (130) is applied with an optical image stabilization (OIS) type exemplary embodiment unlike a general AF (Auto Focusing) actuator applied with a voice coil motor (VCM).

The terminal units (137*a*, 137*b*) may include a first terminal unit (137*a*) receiving, from the PCB (150), a power for moving the lens (120) to a direction of the optical axis (0), and a second terminal unit (137*b*) mounted at a surface opposite to the first terminal unit (137*a*) and receiving, from the PCB (150), a power for moving the lens (120) to a direction vertical to the optical axis (0).

The first terminal unit (137*a*) functions to supply a power to the first coil unit (132) and the second terminal unit (137*b*) functions to supply a power to the second coil unit (134). The first coil unit (132) may receive the power from the PCB (150) and the second coil unit (137*b*) may receive the power from a flexible PCB (FPCB, 190) by being mounted on the FPCB (190) formed at an upper surface of the base (136). In consideration of miniaturization of the camera module, i.e., reducing a height toward z axis direction, which is a direction to the optical axis (0), the second coil unit (134) may be formed in a patterned coil.

The camera module according to an exemplary embodiment of the present disclosure may further include a Hall sensor unit (185) mounted at the FPCB (190) and configured to detect movement of the magnet unit (133). The Hall sensor unit (185) may function to sense an applied voltage and intensity and phase of a current flowing in the coil, and interact with the FPCB (190) to accurately control the actuator (130).

The Hall sensor unit (185) may be mounted on a straight line with the magnet unit (133) to detect displacements of x and y axes. Although the Hall sensor unit (185) is formed nearer to the second coil unit (134) than to the magnet unit (133), the influence of the second coil unit (134) is not under consider for detection of movement of the magnet unit (133), in consideration of the fact that intensity of magnetic field formed by the magnet is several hundred times greater than that of coil.

The shield-can (110) can accommodate the lens (120) and the actuator (130), as mentioned above, to protect internal elements against outside shocks, in addition to protection of the camera module (100) against outside electric wave intervention generated by mobile phones. The shield-can (110) is preferably grounded.

The camera module according to the exemplary embodiment of the present disclosure may include a single multiple tape (180) in order to implement a single manufacturing process of short-circuit prevention of the terminal units (137*a*, 137*b*) and grounding for prevention of static electricity on the shield-can (110). The single multiple tape (180) may be attached to a surface opposite to the shield-can (110) and to a bottom surface of the main area (151) of the PCB (150) in order to electrically conduct the shield-can (110) and the PCB (150) and to insulate the soldered terminal units (137*a*, 137*b*).

As mentioned above, the camera module (100) according to an exemplary embodiment of the present disclosure may further include a posture or a position sensor (191) of OIS type as a constituent element configured to detect a drift (shake) of the camera module (100) and to apply a signal to the second coil unit (134).

Figure 3:
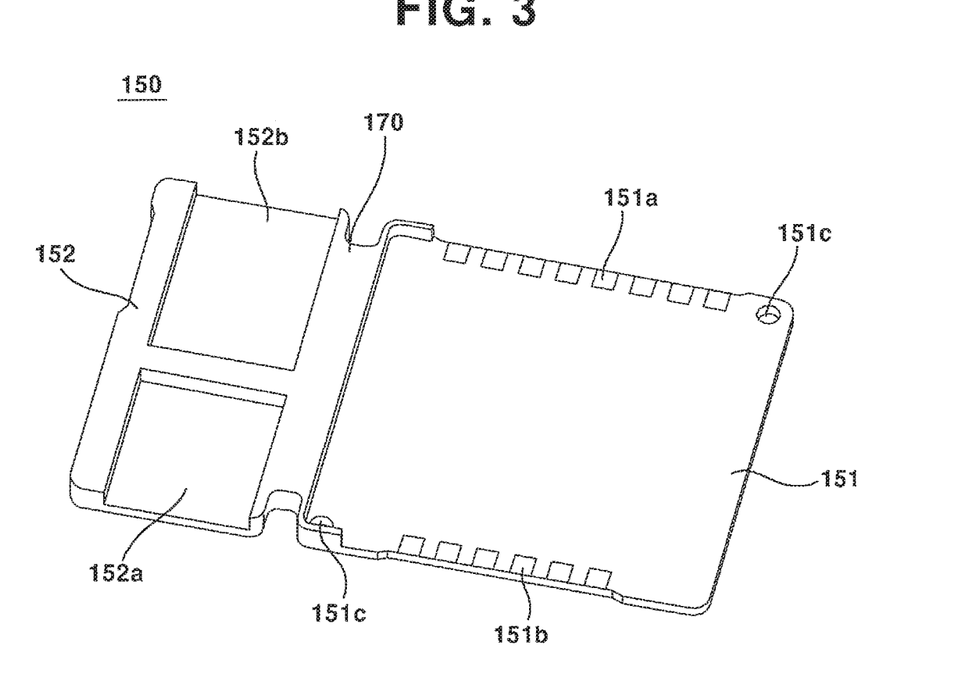
FIG. 3 is a schematic view illustrating a PCB of a camera module according to an exemplary embodiment of the present disclosure.
Figure 4:
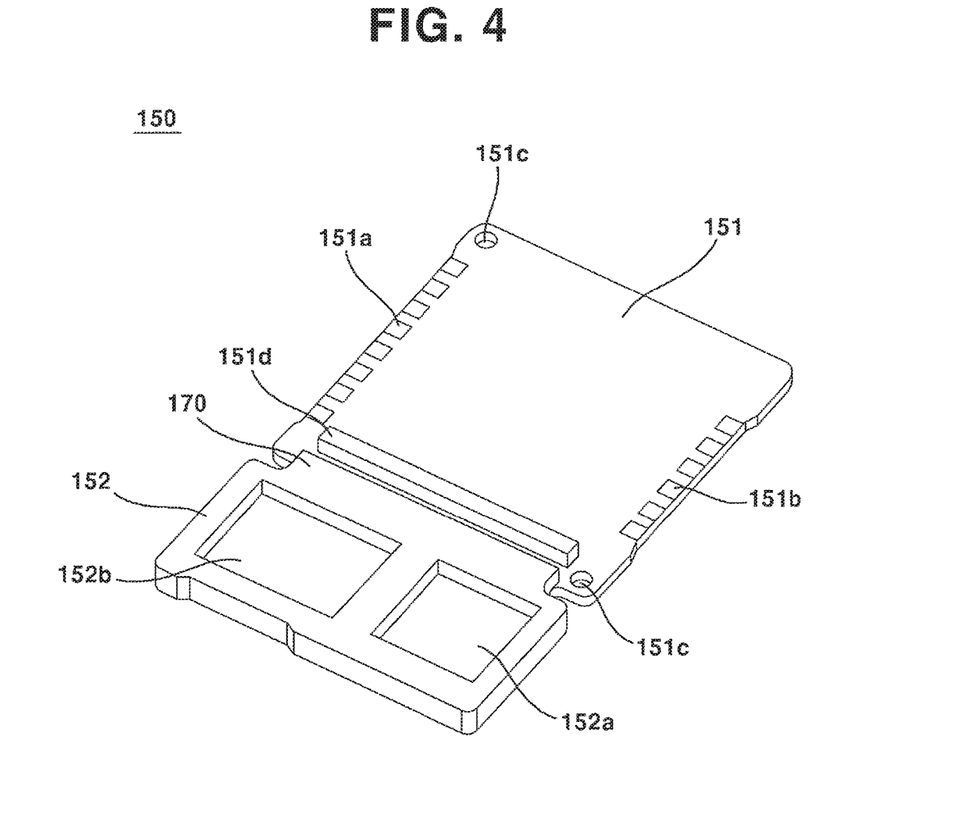
FIG. 4 is a schematic view illustrating a PCB of a camera module according to another exemplary embodiment of the present disclosure.

FIG. 3 is a schematic view illustrating a PCB of a camera module according to an exemplary embodiment of the present disclosure, and FIG. 4 is a schematic view illustrating a PCB of a camera module according to another exemplary embodiment of the present disclosure.

Referring to FIGS. 3 and 4, the drift of the camera module (100) can be detected by the posture sensor (191). The posture sensor (191) may detect an inclination of the lens (120) by being mounted on the sub-area (151) of the PCB (150). The posture sensor (191) is a sensor configured to measure at least one of posture information of the camera module (100), posture information between an object and the camera module (100) using gravity applied to the camera module (100) or inclination. The posture sensor (191) may be one of sensors including an acceleration sensor, a geomagnetic sensor and a gyro sensor but other similar sensor having same or similar function is possible.

A detection signal by the posture sensor (191) is transmitted to a controller (not shown) mounted on the camera module (100). The controller may be mounted on the main area (151) but may be mounted, as illustrated, on the sub-area (152) to reduce volume of the camera module (100). The actuator (130) may apply a driving signal to the second coil unit (134), to be specific, by receiving a signal of the posture sensor (191).

The sub-area (152) of the PCB (150) mounted with the posture or position sensor (191) and the controller may develop a bending phenomenon by moment caused by weight of the posture sensor (191) and the controller. When the PCB (160) is bent, i.e., when the sub-area (152) is bent, an error may be generated in detection of drift of the posture sensor (191) or the camera module as much as a bent angle, and a power may be supplied to the second coil unit (134) by the erroneous detection of the posture sensor (191) to result in decreased performance of the camera module (100).

The exemplary embodiment of the present disclosure may include a strength reinforcement portion (170) configured to connect the sub-area (152) and the main area (151) and formed thicker than the main area (151). The strength reinforcement portion (170) may be integrally formed when the main area (151) and the sub-area (152) are formed on the PCB (150) or may be separately formed.

in the exemplary embodiment of the present disclosure, the sub-area (152) may be formed with a thickness as that of the strength reinforcement portion (170) in order to easily manufacture the PCB (150) and to easily mount the posture sensor (191) and the controller. The sub-area (152) may be formed with sensor coupling recesses (152a, 152b) each having a width corresponding to that of the posture sensor (191) and a width corresponding to that of the controller.

When the controller is mounted at the main area (151), one sensor coupling recess (152a) may be formed that has a width corresponding to that of the posture sensor (191), and when the controller is mounted at the sub-area (152), two sensor coupling recesses (152a, 152b) may be formed that has a width corresponding to that of the posture sensor (191) and that has a width corresponding to that of the controller, respectively. The exemplary embodiment of the present disclosure can enhance productivity and reliability of the camera module (100) using the sensor coupling recesses (152a, 152b).

Referring to FIG. 4, the exemplary embodiment of the present disclosure may further include a guide rib (151d) which is protrusively formed from the main area (151), and which is formed near to the strength reinforcement portion (170) and which is surface-contacted to an inner surface of the shield-can (110), in order to more effectively prevent the bending phenomenon of the sub-area (152). The guide rib (151d) may serve to provide a guidance function when the shield-can (110) is attached to main area (151) of the PCB (150) and simultaneously to prevent generation of moment caused by weight of the posture sensor (191) and the controller by being surface-contacted to the inner surface of the shield-can (110).

As noted above, the exemplary embodiment of the present disclosure may include a base (136) configured to accommodate the IR filter (160) between the main area (151) of the PCB (150) and the shield-can (110). The guide rib (151d) may be protrusively formed on the main area (151) to surface-contact an inner surface of the base. The inclusion of the strength reinforcement portion (170) and the guide rib (151d) can enhance the reliability of the camera module (100) according to the exemplary embodiment of the present disclosure by performing a stable drift correction. The base (136) may be extensively formed to be a strength reinforcement portion according to another exemplary embodiment of the present disclosure.

Figure 5:
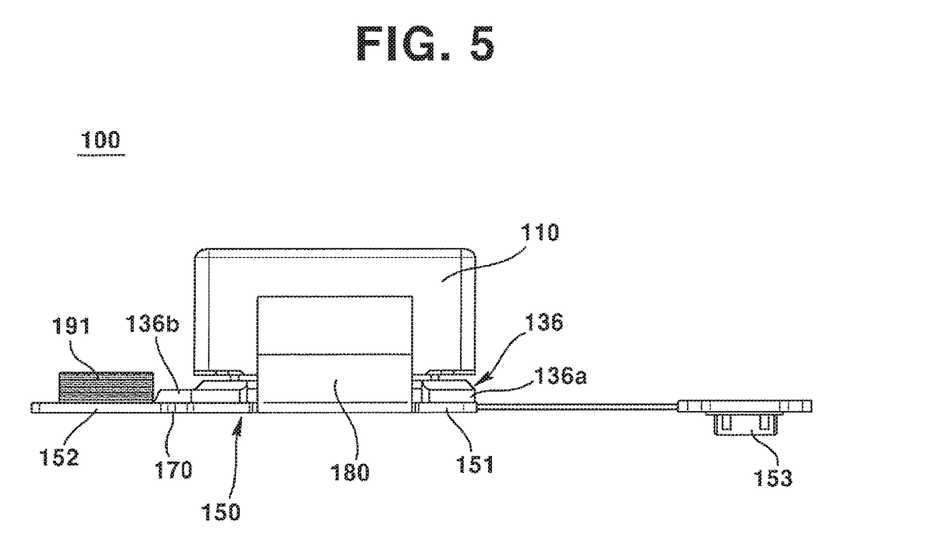
FIG. 5 is a lateral view illustrating a camera module according to another exemplary embodiment of the present disclosure.
Figure 6:
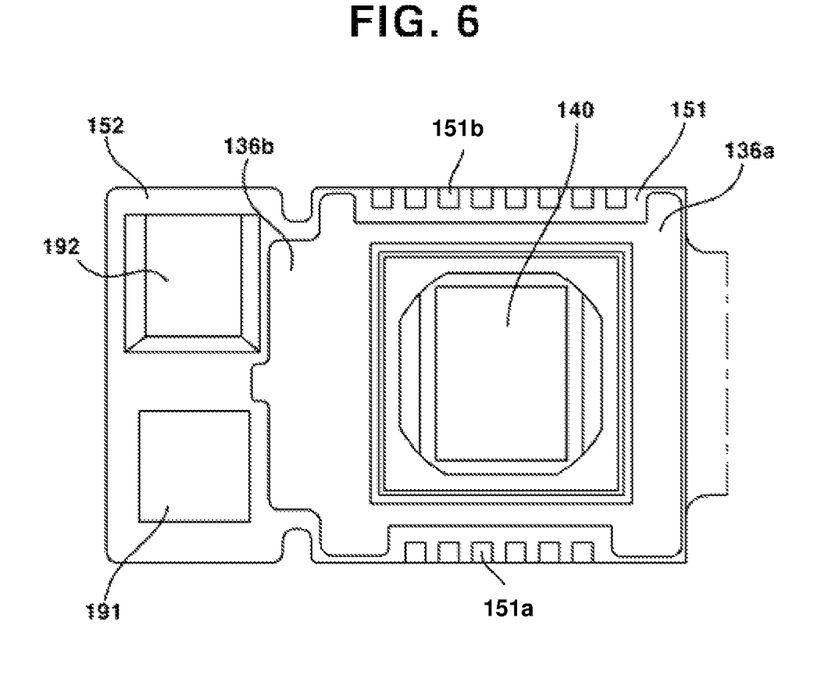
FIG. 6 is a schematic view shown from the top of FIG. 5.

FIG. 5 is a lateral view illustrating a camera module according to another exemplary embodiment of the present disclosure and FIG. 6 is a schematic view shown from the top of FIG. 5. The camera module according to another exemplary embodiment of the present disclosure may include a strength reinforcement portion (136b) extensively formed from a body (136a) of the base (136) to a direction of the sub-area (152). The strength reinforcement portion (136b) may be integrally formed with the body (136a) or independently formed from the body (136b).

The camera module according to another exemplary embodiment of the present disclosure can prevent the bending phenomenon of the PCB (150) caused by weight of the posture sensor (191) and a controller (192) by equipping the strength reinforcement portion (136b), whereby reliability can be enhanced relative to drift detection function of the posture sensor (191).

The bobbin (131) of the lens (120) is coupled by no-screw engagement structure according to the exemplary embodiment of the present disclosure. Concomitant with trend for a high performance camera module, the coupling method by way of no-screw engagement structure may be more efficient than that of thread structure in view of the fact that an error range in alignment of optical axis (0) is more strictly required.

Referring to FIG. 1 again, the method of no-screw engagement structure is such that a hollow area of the bobbin (131) is inserted upwardly or downwardly by the lens (120) to fix the lens (120) to the bobbin (131). An adhesive material (1) is coated on a contact surface between the bobbin (131) and the lens (120) to securely fix the bobbin (131) and the lens (120).

The adhesive material (1) may be realized by thermosetting epoxy or UV epoxy, and cured by heat or ultraviolet (UV) exposure. However, in case of using the thermosetting epoxy, the bobbin (131) and the lens (120) are moved inside an oven or directly heated for curing, and in case of UV epoxy, the adhesive material (1) is applied with UV for curing. The adhesive material (1) may be an epoxy where thermosetting and UV curing are mixed, or may be an epoxy where all the thermosetting and UV curing are used or where one of the thermosetting and UV curing is selectively used for curing. The adhesive material (1) is not limited to the epoxy, and may include any material that is adhesive as alternative material to the adhesive material (1).

The adhesive material (1) may be coated in a ring shape on an entire area of the contact area between the bobbin (131) and the lens (120), or may be coated in spots each spot spaced apart at a predetermined distance, or may be coated in a line shape. The adhesive material (1) thus coated is cured to fix the bobbin (131) and the lens (120).

When the lens (120) is accommodated into the hollow area of the bobbin (131), a fine gap may be formed between a circumference of the lens (120) and an inner surface of the bobbin (131). The adhesive material (1) in this structure moves in the gap to be transferred to an image area, i.e., to the IR filter (160) formed at the base (136) side and/or to the image sensor (140) along the gap between the bobbin (131) and the lens (120), whereby defects may be generated by foreign objects to degrade the function of the camera module (100).

Thus, the lens (120) of the camera module (100) according to the exemplary embodiment of the present disclosure may include a groove (122) to prevent the adhesive material (1) from moving. In short, the groove (122) may be formed at a circumference of the lens (120). The groove (122) may take a shape of a recess to capture or trap the adhesive material (1).

The groove (122) may be formed at a circumference of the lens (120) to prevent defects of camera module (100) caused by foreign objects from inroad of adhesive material (1) into the camera module (100), by capturing the adhesive material (1) inside the groove (122) and by using the viscosity of the adhesive material (1) that may penetrate and move inside the camera module. The adhesive material (1) that has penetrated by moving in the gap may stop at the gap using the viscosity and flow characteristic of the UV epoxy, whereby the adhesive material is naturally cured and is prevented from entering the image area.

Although only one groove (122) is illustrated in the drawing, the number of grooves (122) may be more than one according to the exemplary embodiment of the present disclosure. Furthermore, the adhesive material (1) may be coated on an entire contact area of the bobbin (131) and the lens (120) in a ring shape, or may be coated in spots, each spaced apart at a predetermined distance, or may be coated in a line shape, and therefore, the groove (122) may be also formed, in a corresponding manner to the adhesive material (1), on an entire ring shape or in a line shape at a predetermined interval on a part of the circumference of a lens barrel.

The lens (120) may be further formed, from an upper surface to an outside, with a flange unit (121) protrusively formed from an upper circumference of the lens (120). The flange unit (121) may be formed at the lens (120) to provide a space for accommodating the adhesive material (1). Furthermore, the secured accommodation space can bring forth an effect of preventing inroad of the adhesive material (1) into the gap and allow easy alignment of the bobbin (131) and the lens (120) on an optical axis (0).

The lens (120) may not be formed with a flange unit (121) protrusively formed from the circumference, whereas the circumference of the lens (120) may take a shape of a cylinder, where a partial area is escaped to form a staircase at an upper surface of the lens (120) to allow securing a space configured to accommodate the adhesive material at an upper surface of the lens (120).

The bobbin (131) may include an upper end unit (131a) configured to form an upper end at a position corresponding to that of the lens (120) and to have a diameter equal to or greater than an external diameter of the flange unit (121) of the lens (120), a taper unit (131b) configured to be extensively formed to a bottom surface of the upper end unit (131a) and slantly formed to a direction vertical to the optical axis (0), and a bottom end unit (131c) configured to be extensively formed to a bottom surface of the taper unit (131b) and to have a minor diameter equal to or greater than an external diameter of the lens (120).

The bobbin (131) is configured to have a minor diameter capable of accommodate the lens (120) free from the taper unit (131b), and may be formed at an inner surface in a shape of cylinder. With the bobbin (131) formed with the taper unit (131b), the adhesive material may be effectively induced into the groove when the adhesive material is introduced into the gap, or the adhesive material may be naturally cured to be effectively prevented from inroad into an image area by using the viscosity of the adhesive material. A corner of the upper end unit of the bobbin (131) may be further formed with an inclination unit which may more easily help cure the adhesive material (1).

The lens (120) in this structure may be introduced into the upper end unit of the bobbin (131) to be downwardly moved and finally accommodated into the bottom end unit (131c). The downward movement of the lens (120) may be limited due to the flange unit (121) of the lens (120) being hitched at the taper unit (131b) of the bobbin (131). The flange unit (121) of the lens (120) and the taper unit (131b) of the bobbin (131) functions as a stopper limiting the downward movement when the lens (120) is assembled to the bobbin (131), and functions to limit an inward inroad of the adhesive material (1). When the bobbin (131) is free from the taper unit (131b), the adhesive material may be directly cured by positioning the lens (120) to a fixed position of the bobbin (131) where there is no stopper capable of hitching the flange unit (121).

Although the groove (122) is shown, in the drawing as being formed, at a circumference of the lens (120) at a position corresponding to that of the taper unit (131b) of the bobbin (131), the groove (122) may be formed at a circumference of the lens (120) at a position of the bottom end unit (131c) of the bobbin (131). The adhesive material (1) coated on an upper surface of the flange unit (121) is absorbed into the groove (122) while penetrating and being introduced to the bottom surface along a contact surface between the bobbin (131) and the lens (120), but limited in any further movement by the groove (122). The position of the groove (122) at the lens (120) may be formed at any place of the circumference of the lens (120) and the groove (122) is formed at an upper circumference of the lens (120) in the exemplary embodiment of the present disclosure.

In short, the exemplary embodiments of the present disclosure is formed with a groove (122) to limit the movement of adhesive material (1) whereby the adhesive material is prevented from being transferred to an image area, i.e., an IR filter (160) formed at a base (136) and an image sensor (140) to thereby enhance the reliability of the camera module (100).

In one aspect, a camera module comprises a printed circuit board (PCB) including a main area and a sub-area at a side of the main area; an image sensor on the main area; a base including a body coupled to the main area and a reinforcement portion extended from the body toward the sub-area to be coupled to a portion of the sub-area; a lens disposed at a position corresponding to that of the image sensor over the body of the base; an actuator configured to fix the lens and to be electrically connected to the PCB; and a posture sensor on the PCB.

In another general aspect of the present application, a camera module comprises a PCB including a main area and a sub-area at a side of the main area; an image sensor on the main area; a lens disposed at a position corresponding to that of the image sensor above the main area; an actuator configured to fix the lens and to be electrically connected to the PCB; a posture sensor on the sub-area; and a reinforcement portion configured to connect the main area to the sub-area and to have a thickness thicker than that of the main area.

In still another general aspect of the present application, a camera module comprises a PCB including a main area and a sub-area at a side of the main area; an image sensor on the main area; a base accommodating an infrared (IR) filter and disposed at a position corresponding to that of the image sensor above the main area; a lens disposed at a position corresponding to that of the IR filter above the base; an actuator configured to fix the lens and to be electrically connected to the PCB; a posture sensor on the sub-area; and a reinforcement portion configured to connect the main area to the sub-area and to have a thickness thicker than that of the main area.

Teachings in accordance with the exemplary embodiments of the present disclosure have an advantageous effect in that productivity and reliability of a camera module can be improved by mounting a posture sensor on a PCB including a strength reinforcement portion and a guide rib.

Another advantageous effect is that reliability of a camera module can be improved by including a structure-improved base, promoting a bending prevention of a PCB and stably mounting a posture sensor on the PCB.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the terms to describe most appropriately the best method he or she knows for carrying out the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a printed circuit board (PCB) comprising a main area and a sub-area extended from the main area; an image sensor disposed on an upper surface of the main area;
   a plurality of electronic components provided on an upper surface of the sub-area;
   a base provided on an upper surface of the PCB;
   a cover coupled to the base;
   a bobbin provided inside the cover;
   a first coil provided on the bobbin;
   a magnet provided inside the cover and facing the first coil;
   a second coil provided on the base and facing the magnet; and
   a lens coupled with the bobbin and provided at a position corresponding to that of the image sensor, wherein the base includes a body coupled to the main area and a reinforcement portion extended from the body toward the sub-area to be coupled to a portion of the sub-area,
   wherein the plurality of electronic components includes a posture sensor configured to detect a shake of the camera module and a controller that applies a driving current to the first coil and the second coil in response to a signal from the posture sensor, and
   wherein a protrusion is protruded from the reinforcement portion toward a space between the electronic components.

2. The camera module of claim 1, wherein the body of the base and the reinforcement portion of the base is integrally formed.

3. The camera module of claim 1, wherein a terminal unit is formed on the upper surface of the main area, and wherein the base includes a recess portion configured to expose the terminal unit of the main area.

4. The camera module of claim 3, wherein a groove is recessedly formed from a lateral surface of a portion of the PCB, wherein the groove is spaced from the terminal unit of the main area, and wherein the base includes an extension portion extended from the body and provided between the groove and the terminal unit of the main area.

5. The camera module of claim 1, wherein the posture sensor includes a gyro sensor.

6. The camera module of claim 1, further comprising:
   an infrared (IR) filter mounted at the body of the base to be arranged at a position corresponding to that of the image sensor.

7. The camera module of claim 1, wherein the sub-area has a recess whose width corresponds to that of the electronic component.

8. The camera module of claim 1, wherein the sub-area has two recesses whose widths corresponds to that of the posture sensor and the controller.

9. The camera module of claim 1, wherein the sub-area and the main area are provided in a same imaginary plane.

10. The camera module of claim 1, wherein a first terminal unit is provided on a lateral surface of the base and coupled with a second terminal unit of the main area, and
    wherein the first terminal unit provided on the base is electrically connected with the first coil and the second coil.

11. The camera module of claim 1, further comprising:
    a tape attached a lateral surface of the shield-can and a bottom surface of the PCB, and
    wherein the tape covers a terminal unit provided on the base.

12. An optical apparatus comprising the camera module of claim 1.

13. A camera module comprising:
    a printed circuit board (PCB) comprising a main area and a sub-area extended from the main area;
    an image sensor provided on an upper surface of the main area;
    an electronic component provided on an upper surface of the sub-area;
    a base provided on an upper surface of the PCB;
    a cover coupled to the base;
    a bobbin provided inside the cover;
    a first coil provided on the bobbin;
    a magnet provided inside the cover and facing the first coil;
    a second coil provided on the base and facing the magnet;
    a lens coupled with the bobbin and provided at a position corresponding to that of the image sensor;
    a shield-can configured to accommodate the cover and coupled with the base;
    a first terminal unit and a second terminal unit provided on a lateral surface of the base, wherein the second terminal unit is provided opposite to the first terminal unit; and
    a third terminal unit and a fourth terminal unit provided on the upper surface of the main area, wherein the base includes a body coupled to the main area and a reinforcement portion extended from the body toward the sub-area to be coupled to a portion of the sub-area, wherein the base includes a first recess portion formed at a first lateral surface of the base and a second recess portion formed at a second lateral surface of the base, wherein the first lateral surface of the base is provided opposite to the second lateral surface of the base, wherein the first terminal unit is provided in the first recess portion and the second terminal unit is provided in the second recess portion, wherein the first terminal unit is coupled with the third terminal unit, and the second terminal unit is coupled with the fourth terminal unit, and wherein the first terminal unit and the second terminal unit are electrically connected with the first coil and the second coil, respectively.

14. A camera module comprising:

a printed circuit board (PCB) comprising a main area and a sub-area extended from the main area;

a terminal unit provided on an upper surface of the main area;

an image sensor provided on the upper surface of the main area;

an electronic component provided on an upper surface of the sub-area;

a base provided on an upper surface of the PCB;

a cover coupled to the base;

a bobbin provided inside the cover;

a first coil provided on the bobbin;

a magnet provided inside the cover and facing the first coil;

a lens coupled with the bobbin and provided at a position corresponding to that of the image sensor;

a second coil provided on the base and facing the magnet;

a shield-can configured to accommodate the cover and coupled with the base; and a tape attached a lateral surface of the shield-can and a bottom surface of the PCB, wherein the base includes a body coupled to the main area and a reinforcement portion extended from the body toward the sub-area to be coupled to a portion of the sub-area, wherein the base includes a recess portion configured to expose the terminal unit of the main area, and wherein the tape covers a terminal unit provided on the base and coupled with the terminal unit of the PCB.

* * * * *